United States Patent [19]

Tzavaras

[11] Patent Number: 5,117,942
[45] Date of Patent: Jun. 2, 1992

[54] APPARATUS FOR SUSPENDING A PERSON ABOVE GROUND

[76] Inventor: Constantine Tzavaras, 18 Hodgkins Dr., Ipswich, Mass. 01938

[21] Appl. No.: 532,942

[22] Filed: Jun. 4, 1990

[51] Int. Cl.⁵ .......................................... A01M 31/02
[52] U.S. Cl. ..................... 182/142; 182/187
[58] Field of Search ................ 182/142, 187, 188

[56] References Cited

U.S. PATENT DOCUMENTS

| | | | |
|---|---|---|---|
| 358,104 | 2/1887 | Betten | 182/142 |
| 1,027,724 | 5/1912 | Haney | 182/142 |
| 3,116,808 | 1/1964 | Riley | 182/187 |
| 3,358,789 | 12/1967 | Laun | 182/187 |
| 3,957,135 | 5/1976 | Lane | 182/142 |
| 3,990,536 | 11/1976 | Wilburn | 182/187 |
| 4,069,891 | 1/1978 | McClung | 182/187 |
| 4,205,733 | 6/1980 | Wade | 182/142 |
| 4,347,913 | 9/1982 | Cromer | 182/142 |
| 4,347,914 | 9/1982 | Gary | 182/142 |
| 4,667,773 | 5/1987 | Davis | 182/187 |
| 4,694,934 | 9/1987 | Erickson | 182/142 |
| 4,813,441 | 3/1989 | Kepley | 182/187 |
| 4,919,228 | 4/1990 | Stefan | 182/142 |

Primary Examiner—Reinaldo P. Machado
Attorney, Agent, or Firm—Michael M. Murray

[57] ABSTRACT

An apparatus for suspending a user (such as a hunter) above the ground, the apparatus protecting the hunter from bad weather and designed to allow the hunter to raise the apparatus easily. The apparatus includes a base to support the hunter, and a protective canopy positioned to at least partially cover the base. A first pulley is secured at a fixed distance from a support member (such as a tree branch), and a second pulley is secured at a fixed distance from the base. A rope passes through each of the pulleys with a first end of the rope secured such that a hunter positioned on the base can raise the base toward the support member by pulling a second end of the rope. In the preferred embodiments a third pulley is positioned at a fixed distance from the support member, with the rope also passing through the third pulley. The first pulley can be suspended from the support member by a second rope. A flexible covering between the canopy and the base forms an enclosed space that can completely protect the hunter from bad weather. Two or more poles are connected between the base and the canopy to support the canopy above the base. The poles are collapsible such that the distance between the canopy and said base can be substantially reduced for easy storage and transportation.

7 Claims, 1 Drawing Sheet

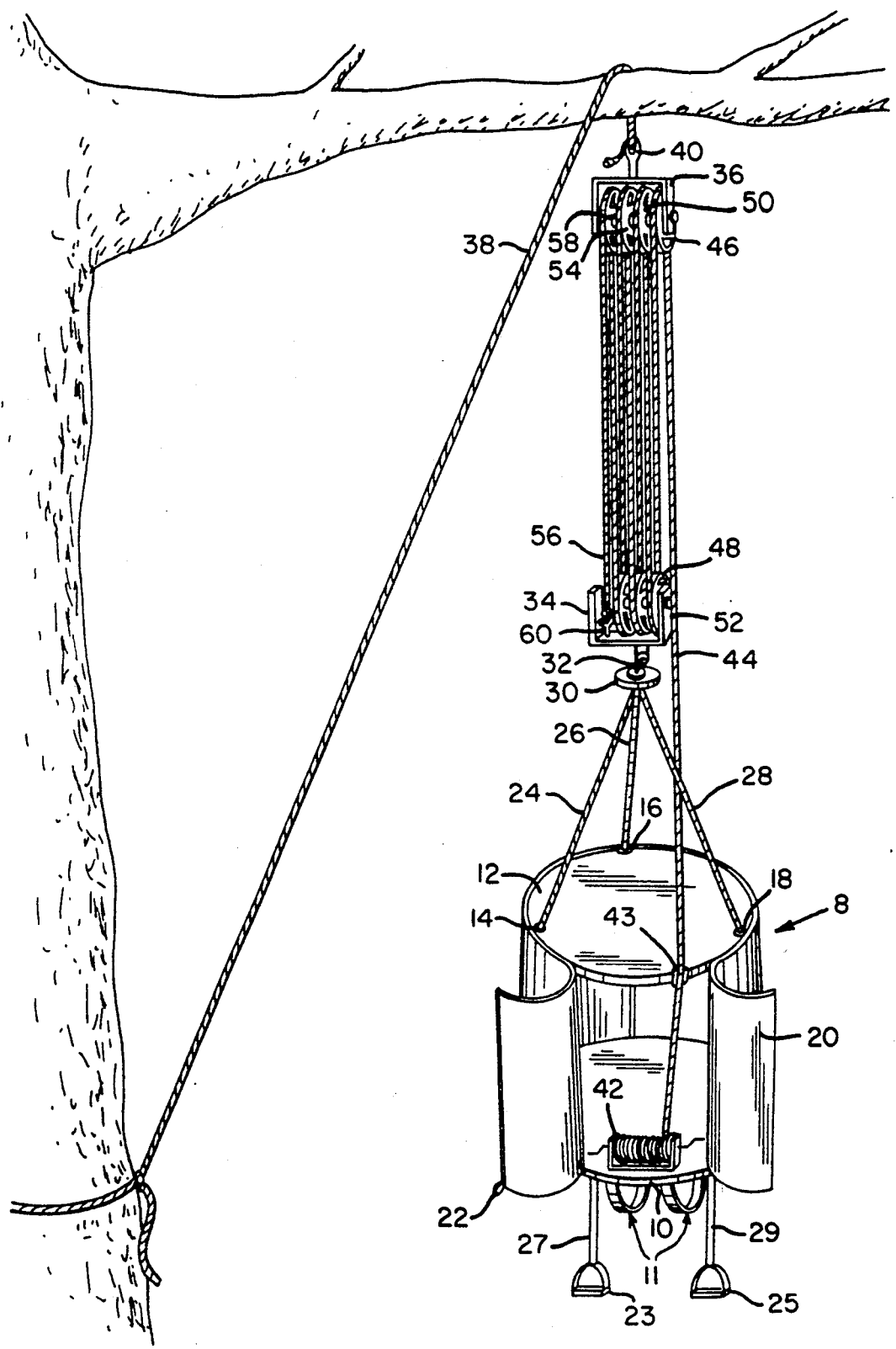

APPARATUS FOR SUSPENDING A PERSON ABOVE GROUND

FIELD OF THE INVENTION

The invention is related to devices that can be used to suspend persons or objects above the ground.

BACKGROUND OF THE INVENTION

Hunters and nature enthusiasts usually attempt to observe wildlife such as deer without being detected by the wildlife in order to prevent the wildlife from being scared away. Because wildlife detect humans both by sight and through a keen sense of smell, camouflage alone will not prevent the hunters from being detected. Therefore, hunters often try to position themselves downwind so that wildlife will not be able to smell them. This does not always work since wildlife can approach the hunter from any direction. It is generally well known that if a hunter can position himself high above the ground, he will increase his chances of remaining undetected by wildlife, since animals generally do not look up and are less likely to detect the human scent if the hunter is not at ground level.

Hunter's seats are available that can be attached to a tree at a substantial distance above the ground. For example, U.S. Pat. No. 4,813,441 to Kepley discloses a hunter's seat that can be attached to the trunk of a tree. The hunter then climbs up into the seat and can observe wildlife from the elevated position. U.S. Pat. No. 4,347,914 to Gary discloses a tree sling which can be used by a hunter to hoist himself up into a tree. The hunter sits in the sling and turns a hand crank which draws in a rope that is secured to a branch high up in the tree. As the rope is drawn in, the sling and hunter are raised up into the tree.

SUMMARY OF THE INVENTION

The invention generally features an apparatus for suspending a user (such as a hunter) above the ground, the apparatus protecting the hunter from bad weather. The apparatus includes a base to support the hunter, a protective canopy positioned to at least partially cover the base, and some device for suspending the base above the ground.

The invention also generally features an apparatus for allowing a hunter to easily raise himself above the ground. The apparatus includes a base to support the hunter, a first pulley secured at a fixed distance from a support member (such as a tree branch), a second pulley secured at a fixed distance from the base, and a rope passing through each of the pulleys with a first end of the rope secured such that a hunter positioned on the base can raise the base toward the support member by pulling a second end of the rope.

In the preferred embodiments a third pulley is positioned at a fixed distance from the support member, with the rope also passing through the third pulley. The first pulley is suspended from the support member by a second rope. A flexible covering between the canopy and the base forms an enclosed space hat can completely protect the hunter from bad weather. Two or more poles are connected between the base and the canopy to support the canopy above the base. The poles are collapsible such that the distance between the canopy and the base can be substantially reduced for easy storage and transportation.

BRIEF DESCRIPTION OF THE DRAWING

The sole drawing is a perspective view of an apparatus for suspending a person above ground in accordance with the invention.

DETAILED DESCRIPTION OF THE PREFERRED EMBODIMENTS

Referring to the figure, the invention includes an enclosure 8 which can support a person who wishes to elevate himself above the ground. Enclosure 8 includes a base 10 connected to a canopy 12 by three support poles 14, 16 and 18. A canvas covering 20 is connected between base 10 and canopy 12 and can be zippered closed using a zipper 22 to form an enclosed protected space between base 10 and canopy 12. Enclosure 8 includes two leg supports 23, 25, attached to base 10 through straps 27 and 29, respectively.

Enclosure 8 is suspended by three ropes 24, 26 and 28 which are secured at their lower ends to the uppermost portions of poles 14, 16 and 18, respectively. Ropes 24, 26 and 28 are all attached at their upper ends to a support 30 which includes a hook 32 on its upper surface. Hook 32 is hooked onto the lower portion of a pulley bracket 34. A second pulley bracket 36 has a support 40 on its upper surface to which a rope 38 is secured. Rope 38 wraps around a suitable support member such as a tree branch and is secured to an appropriate place near the ground, such as the trunk of the tree.

Secured to base 10 is a winch 42 which can be operated to draw in or let out a second rope 44. Rope 44 passes from winch 42 up to a pulley 46 on pulley bracket 36, passes through pulley 46 and down to a pulley 48 on pulley bracket 34. Rope 44 passes through pulley 48 and returns up to a second pulley 50 on pulley bracket 36. Rope 44 similarly passes over pulleys 52, 54, 56 and 58, finally terminating at anchoring mechanism 60 on pulley bracket 34. A guiding mechanism 43 is attached to the edge of canopy 12 and guides rope 44 to prevent excessive friction between the edge of canopy 12 and rope 44. A pair of straps 11 are attached to the bottom surface of base 10 to facilitate transporting the device by a single user.

When a hunter wishes to raise himself above the ground, he first locates a suitable support, such as a strong branch of a tree, and then throws rope 38 over the branch. A stone or other weight maybe tied to one end of rope 38 to facilitate tossing the rope over the branch. The hunter then secures one end of rope 38 to support 40 on pulley bracket 36 and raises pulley bracket 36 until it is a suitable distance above the ground. The other end of rope 38 is then tightly secured to a support near the ground, such as the trunk of the tree. The hunter then positions himself inside enclosure 8, preferably sitting on base 10, and proceeds to raise enclosure 8 above the ground by turning the handle on winch 42 to draw in rope 44. As winch 42 draws in rope 44, pulley bracket 34 will be raised towards pulley bracket 36 thereby raising both enclosure 8 and the hunter.

The use of multiple pulleys in the manner shown in the figure will allow enclosure 8 to be raised relatively easily. In other words, only a small amount of force will be required to turn winch 42 in order to successfully raise enclosure 8. The number of pulleys can be varied depending on the strength of the hunter and on how fast the hunter wants to be able to raise himself. When more pulleys are used it requires less force to raise the enclosure. However, using fewer pulleys will increase the speed that the enclosure can be raised.

Canvas covering 20 has one or more pockets (not shown in the figure) that can be used to store objects or food, etc. Poles 14, 16, 18 are preferably collapsible such that, when the device is not in use, the poles can be collapsed to lower canopy 12 close to base 10. The pulleys and ropes can be deposited inside enclosure 8, and the canopy 11 are zippered closed to provide convenient storage. Furthermore, straps can be attached to the underside of base 10 so that the hunter can wear the device on his back like a backpack to easily transport it as he moves about in search of a good location to use the invention.

Canvas covering 20 can be replaced by a screen, or can have screened windows much like a tent. Winch 42 can include gears in order to further facilitate recoiling rope 44, and can have a safety latch to prevent rope 44 from rapidly unwinding and causing enclosure 8 to fall. Canopy 12 is slightly concave in order to prevent rain from forming puddles, which could add weight to the device.

Other embodiments are within the scope of the following claims.

I claim:

1. A portable apparatus for suspending a user from a support member located above the ground, said apparatus comprising:
   a base to support a user;
   a first pulley secured at a fixed distance from said support member;
   a second pulley secured at a fixed distance from said base;
   a rope passing through each of said pulleys with a first end of said rope secured such that a user positioned on said base can raise said base toward that a user positioned on said base can raise said base toward said support member by pulling a second end of said rope; and
   means for securing said portable apparatus to a user to facilitate transporting said apparatus to a desired location by a single user.

2. The apparatus of claim 1 further comprising a third pulley, said third pulley positioned at a fixed distance from said support, wherein said rope passes through each of said pulleys.

3. The apparatus of claim 2 wherein said third pulley is positioned adjacent to said first pulley.

4. The apparatus of claim 1 further comprising a canopy substantially covering said base.

5. The apparatus of claim 1 wherein said first pulley is suspended from said support member by a second rope.

6. A portable apparatus for suspending a user from a support member located above the ground, said apparatus comprising:
   a base to support a user;
   a canopy substantially covering said base;
   a flexible covering between said canopy and said base to form an at least partially enclosed space;
   a first pulley secured at a fixed distance from said support member;
   a second pulley secured at a fixed distance from said base; and
   a rope passing through each of said pulleys with a first end of said rope secured such that a user positioned on said base can raise said base toward said support member by pulling a second end of said rope.

7. A portable apparatus for suspending a user from a support member located above the ground, said apparatus comprising:
   a base to support a user;
   a canopy substantially covering said base;
   at least two poles connected between said base and said canopy to support said canopy above said base, said poles being collapsible such that the distance between said canopy and said base can be substantially reduced;
   a first pulley secured at a fixed distance from said support member;
   a second pulley secured at a fixed distance from said base; and
   a rope passing through each of said pulleys with a first end of said rope secured such that a user positioned on said base can raise said base toward said support member by pulling a second end of said rope.

* * * * *